(12) United States Patent
Satou et al.

(10) Patent No.: US 9,376,004 B2
(45) Date of Patent: Jun. 28, 2016

(54) ANTI-VIBRATION DEVICE FOR VEHICLE

(75) Inventors: Yuusuke Satou, Ebina (JP); Masahiko Kondo, Yokohama (JP); Hiroshi Kojima, Yokohama (JP); Fumiharu Kurose, Yokohama (JP); Motohiro Yanagida, Yokohama (JP); Akira Ueki, Kamakura (JP)

(73) Assignees: NISSAN MOTOR CO., LTD., Yokohama-shi, Kanagawa (JP); BRIDGESTONE CORPORATION, Tokyo (JP)

( * ) Notice: Subject to any disclaimer, the term of this patent is extended or adjusted under 35 U.S.C. 154(b) by 143 days.

(21) Appl. No.: 14/127,247

(22) PCT Filed: Jun. 13, 2012

(86) PCT No.: PCT/JP2012/065083
§ 371 (c)(1),
(2), (4) Date: Dec. 18, 2013

(87) PCT Pub. No.: WO2013/018444
PCT Pub. Date: Feb. 7, 2013

(65) Prior Publication Data
US 2014/0124645 A1 May 8, 2014

(30) Foreign Application Priority Data
Jul. 29, 2011 (JP) .................... 2011-166467

(51) Int. Cl.
| | |
|---|---|
| F16M 1/00 | (2006.01) |
| F16M 3/00 | (2006.01) |
| B60K 5/12 | (2006.01) |
| F16F 1/38 | (2006.01) |
| F16F 7/10 | (2006.01) |
| F16F 15/02 | (2006.01) |
| B60K 5/04 | (2006.01) |

(52) U.S. Cl.
CPC ............. *B60K 5/1283* (2013.01); *B60K 5/1208* (2013.01); *F16F 1/3849* (2013.01); *F16F 7/1005* (2013.01); *F16F 7/1011* (2013.01); *F16F 15/02* (2013.01); *B60K 5/04* (2013.01)

(58) Field of Classification Search
CPC ... B60K 5/1283; B60K 5/1241; F16F 7/1005; F16F 15/02
See application file for complete search history.

(56) References Cited

U.S. PATENT DOCUMENTS

| | | | | |
|---|---|---|---|---|
| 4,685,531 | A * | 8/1987 | Kopich | ................ B60K 5/1283 180/300 |
| 8,827,250 | B2 * | 9/2014 | Satou | .................... F16F 7/1011 267/140.11 |
| 2012/0098177 | A1 | 4/2012 | Satou et al. | |

FOREIGN PATENT DOCUMENTS

| | | |
|---|---|---|
| JP | H06-323362 A | 11/1994 |
| JP | 2000-185651 A | 7/2000 |
| JP | 2009-243548 A | 10/2009 |
| JP | 2011-012757 A | 1/2011 |

* cited by examiner

*Primary Examiner* — Amy Sterling
(74) *Attorney, Agent, or Firm* — Drinker Biddle & Reath LLP (57) ABSTRACT

An anti-vibration device for a vehicle including a rod (11) fixed to an engine (1) at one end portion (12) thereof and fixed to a vehicle body at the other end portion (13) thereof, an inertia mass (15) supported on the rod (11), an actuator (17) operative to reciprocate the inertia mass in an axial direction of the rod, and an acceleration sensor (21) that detects vibration of the rod in the axial direction. The acceleration sensor (21) is disposed between the one end portion (12) of the rod (11) and the other end portion (13) of the rod (11). Accordingly, sensitivity to pitch vibration of the rod (11) is reduced so that accuracy in detection of rigid body resonance in the axial direction is enhanced.

9 Claims, 13 Drawing Sheets

VEHICLE
UPWARD

VEHICLE
RIGHTWARD

FIG. 5B

VEHICLE
UPWARD

VEHICLE
FORWARD

FIG. 5C

VEHICLE
UPWARD

VEHICLE
RIGHTWARD

VEHICLE
FORWARD

VEHICLE
RIGHTWARD

ENGINE VIBRATION GENERATED BY
SECONDARY UNBALANCED INERTIA FORCE

SECONDARY UNBALANCED
INERTIA FORCE

VEHICLE
UPWARD

VEHICLE
RIGHTWARD

ANTI-VIBRATION DEVICE FOR VEHICLE

TECHNICAL FIELD

The present invention relates to an anti-vibration device for a vehicle which suppresses vibration transmitted from an engine as a vibration source to a side of a vehicle body.

BACKGROUND ART

There has been proposed an anti-vibration device for suppressing vibration transmitted from an engine to a side of a vehicle body which is constructed to set a rigid body resonance frequency of a torque rod to a value lower than that of the engine and operate an actuator to generate a force that is proportional to an axial direction displacement velocity of the rod (Patent Literature 1).

However, in the above conventional anti-vibration device, a vibration acceleration sensor that detects rigid body resonance in an axial direction of the torque rod is constructed to also detect a rigid body resonance component in a pitch direction of the torque rod. Therefore, accuracy in detection of resonance components is lowered so that an expected effect of control of vibration cannot be obtained.

CITATION LIST

Patent Literature

Patent Literature 1: Japanese Patent Application Unexamined Publication No. 2011-12757 A

SUMMARY OF INVENTION

An object of the present invention is to provide an anti-vibration device for a vehicle which is capable of detecting rigid body resonance in an axial direction of a torque rod with enhanced accuracy.

An anti-vibration device of the present invention includes a vibration detecting section disposed between both ends of a torque rod which are fixed to an engine and a vehicle body, respectively.

A node of rigid body resonance in a pitch direction of the torque rod is positioned between the both ends of the torque rod. In the anti-vibration device of the present invention, the vibration detecting section is disposed within a region between the both ends of the torque rod. With this arrangement, the vibration detecting section can be prevented from detecting the rigid body resonance in the pitch direction of the torque rod. As a result, accuracy in detection of rigid body resonance in an axial direction of the torque rod can be enhanced.

DESCRIPTION OF EMBODIMENTS

Figure 1A:
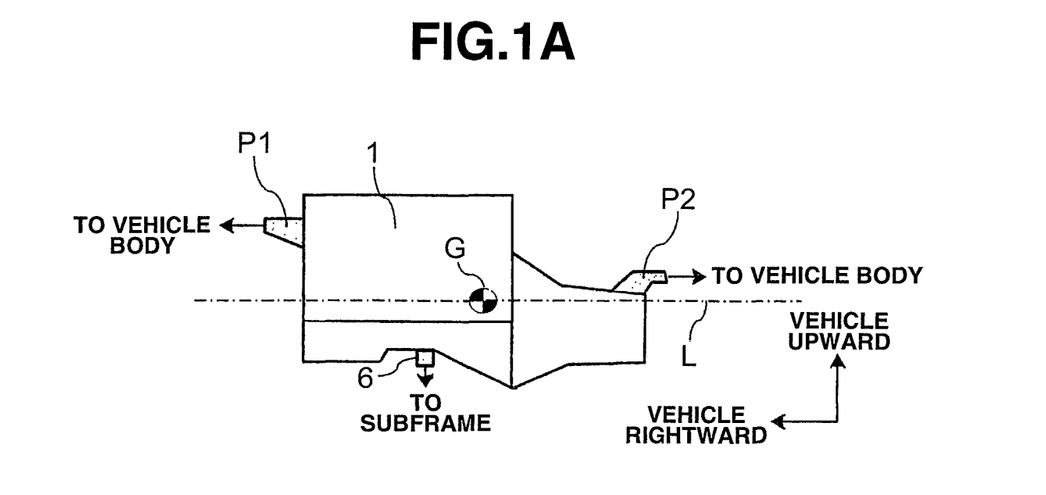
FIG. 1A is a front view of an anti-vibration device according to an embodiment of the present invention which is applied to an engine of a vehicle.
Figure 1B:
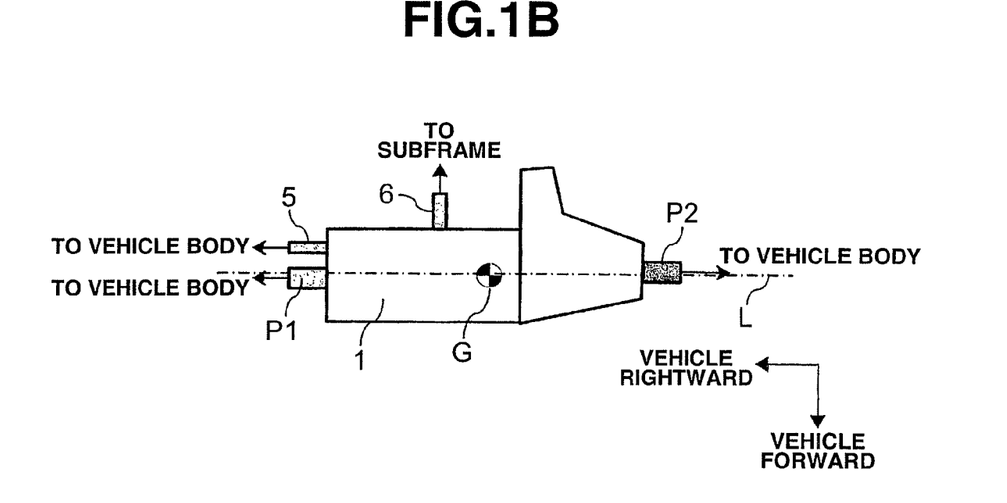
FIG. 1B is a plan view of FIG. 1A.
Figure 2:
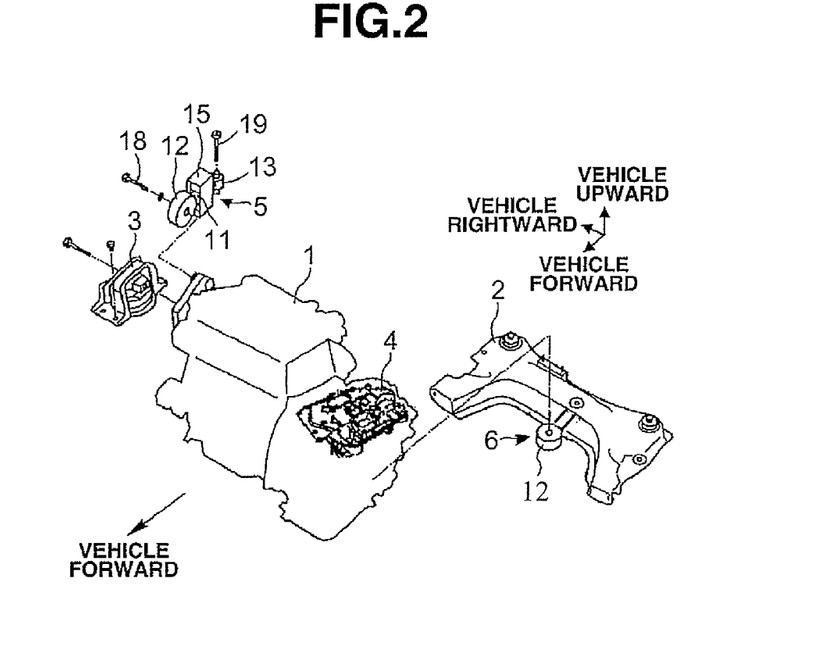
FIG. 2 is an exploded perspective view of the anti-vibration device as shown in FIG. 1A and FIG. 1B.

Firstly, a so-called pendulum type engine supporting structure to which an anti-vibration device according to an embodiment of the present invention is applied is explained. The pendulum type engine supporting structure for engine 1 is shown in FIG. 1A and FIG. 1B. Engine 1 is a so-called transverse engine in which principal axis L of inertia of engine 1 is located in parallel with a width direction of a vehicle (also referred to as a direction perpendicular to a travelling direction of a vehicle or a leftward-rightward direction of a vehicle). In plan view as shown in FIG. 1B, two support points P1, P2 at which engine 1 is supported are positioned in the vicinity of the principal axis L of inertia so as to be present on opposite sides of a center of gravity G of engine 1 in a direction of the principal axis of inertia L on which the center of gravity G of engine 1 is located. In side view as shown in FIG. 1A, both of the two support points P1, P2 are located at upper portions of the vehicle with respect to the principal axis of inertia L. The two support points P1, P2 are constituted of left and right engine mounts 3, 4, respectively, as shown in FIG. 2.

The pendulum type engine supporting structure is configured to support engine 1 in a suspended state such as a pendulum and hold the center of gravity G of engine 1 to swing about the straight line extending between the two support points P1, P2 by rod-shaped members 5, 6 of a torque rod assembly fixed to a vehicle body. The pendulum type engine supporting structure has such an advantage that same damping effect as that of the conventional art can be obtained by a small number of parts. That is, in engine 1 mounted to the vehicle body by the pendulum type engine supporting structure, engine 1 is inclined with respect to an axis extending between the two support points P1, P2 due to a rotary inertia force. In order to support engine 1 with suppressing the inclination, there are provided first torque rod (upper torque rod) 5 that connects a substantially half portion of engine 1 with a member located on a side of the vehicle body, and second torque rod (lower torque rod) 6 that connects the remaining half portion of engine 1 with a member located on a side of the vehicle body. Upper torque rod 5 is connected to engine 1 from a right-upper side of the vehicle body, and lower torque rod 6 is connected to engine 1 from a lower side of the vehicle body. These two torque rods 5, 6 cooperate with each other to prevent inclination of engine 1 supported by the pendulum type supporting structure.

The above-described engine 1 is, for instance, an in-line four-cylinder engine with a secondary balancer or a V-type six-cylinder engine. In the four-cylinder engine with a secondary balancer or the V-type six-cylinder engine, an unbalanced inertia force is small at a basic order of engine rotation, and therefore, mainly a reaction force to engine torque variation acts on engine 1. The present inventors have found that at the basic order of engine rotation, mainly vehicle inside noise/vehicle inside vibration is generated by vibration transmitted to the vehicle body through the two torque rods 5, 6 bearing torque. Further, the present inventors have found that passengers are disturbed by vehicle inside noise of up to approximately 1000 Hz, which is constituted by a higher order of the basic order mainly when the vehicle is accelerated.

As described above, the anti-vibration device according to this embodiment of the present invention includes the two torque rods 5, 6. Upper torque rod 5 is disposed between an upper portion of engine 1 and the vehicle body as shown in FIG. 2. In contrast, lower torque rod 6 is disposed between a lower portion of engine 1 and subframe 2 as shown in FIG. 1A, FIG. 1B and FIG. 2. Since upper torque rod 5 and lower torque rod 6 have same basic construction, the construction of upper torque rod 5 will be explained, and explanation of the construction of lower torque rod 6 is omitted.

Figure 3:
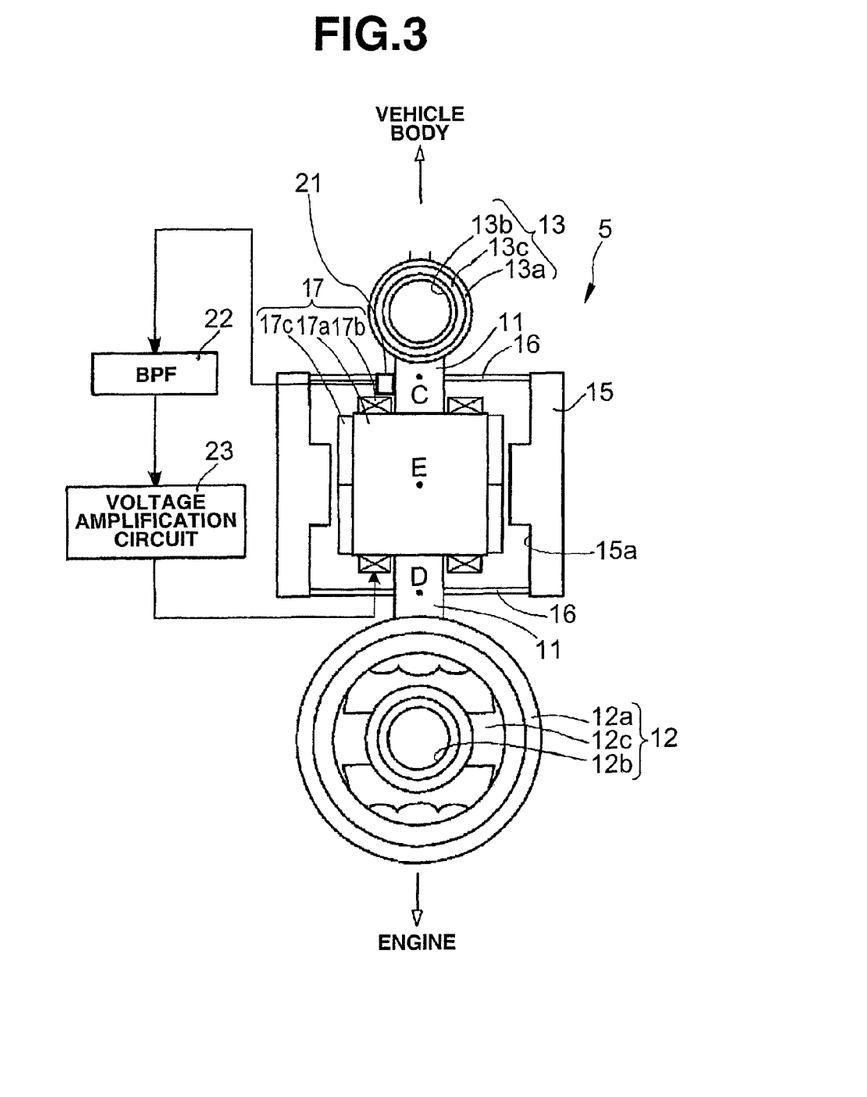
FIG. 3 is a sectional view of an upper torque rod as shown in FIG. 1B.

As shown in FIG. 2 and FIG. 3, upper torque rod 5 includes rod 11 that has bush 12 at one end portion thereof and bush 13 at the other end portion thereof. Bush 12 is fixed to the upper portion of engine 1. Bush 13 is fixed to the vehicle body. Upper torque rod 5 also includes inertia mass 15 supported on rod 11 and actuator 17 that operates inertia mass 15 to reciprocate in an axial direction of rod 11.

FIG. 3 is a sectional view of an essential part of upper torque rod 5. A pair of bushes 12, 13 are fixed to both ends of rod 11 by welding. Bush 12 fixed to an engine side includes cylindrical outer tube 12a, cylindrical inner tube 12b disposed concentrically with outer tube 12a, and elastic body (sound proof material) 12c interposed between outer tube 12a and inner tube 12b to connect these tubes. Bush 12 is fixed to engine 1 by means of a bolt (not shown) that is inserted into inner tube 12b in a direction perpendicular to a plane of FIG. 3.

On the other hand, similarly to bush 12, bush 13 includes cylindrical outer tube 13a, cylindrical inner tube 13b disposed concentrically with outer tube 13a, and elastic body (sound proof material) 13c interposed between outer tube 13a and inner tube 13b to connect these tubes. Bush 13 is fixed to the vehicle body-side member by means of a bolt (not shown) that is inserted into inner tube 13b in the direction perpendicular to the plane of FIG. 3.

In addition, the anti-vibration device of the present invention is not limited to the embodiment shown in the drawings in which bush 12 is fixed to engine 1 and bush 13 is fixed to the vehicle body side. Bush 12 may be fixed to the vehicle body side, and bush 13 may be fixed to engine 1. Further, in upper torque rod 5 shown in FIG. 3, two bolts that are inserted into inner tubes 12b, 13b of bushes 12, 13 are arranged parallel with each other. In contrast, in upper torque rod 5 shown in FIG. 2, FIG. 4A, FIG. 4b and FIGS. 5A-5D, two bolts 18, 19 that are inserted into inner tubes 12b, 13b of bushes 12, 13 are arranged perpendicular to each other. Thus, arrangement of the two bushes can be suitably modified in accordance with a configuration of a fixing portion on the vehicle body side and a fixing portion of the engine.

Elastic bodies (sound proof material) 12c, 13c of this embodiment are members each having both a spring function and a damping function, and may be made of, for instance, elastic rubbers.

In upper torque rod 5 of this embodiment as shown in FIG. 2, FIG. 3, FIG. 4A, FIG. 4B and FIGS. 5A-5D, the outer tubes of bushes 12, 13 have diameters different from each other, and the inner tubes thereof have diameters different from each other. Specifically, the diameters of outer tube 13a and inner tube 13b of bush 13 are smaller than the diameters of outer tube 12a and inner tube 12b of bush 12, respectively. Further, elastic body 13c of bush 13 has a rigidity larger than a rigidity of elastic body 12c of bush 12. By setting the rigidities of elastic bodies 12c, 13c of the pair of bushes 12, 13 to be different from each other, engine rigid body resonance and rod rigid body resonance in a rod axis direction (axial direction of rod 11) which are suitable for double vibration proofing can be generated at two frequencies different from each other.

Figure 9:
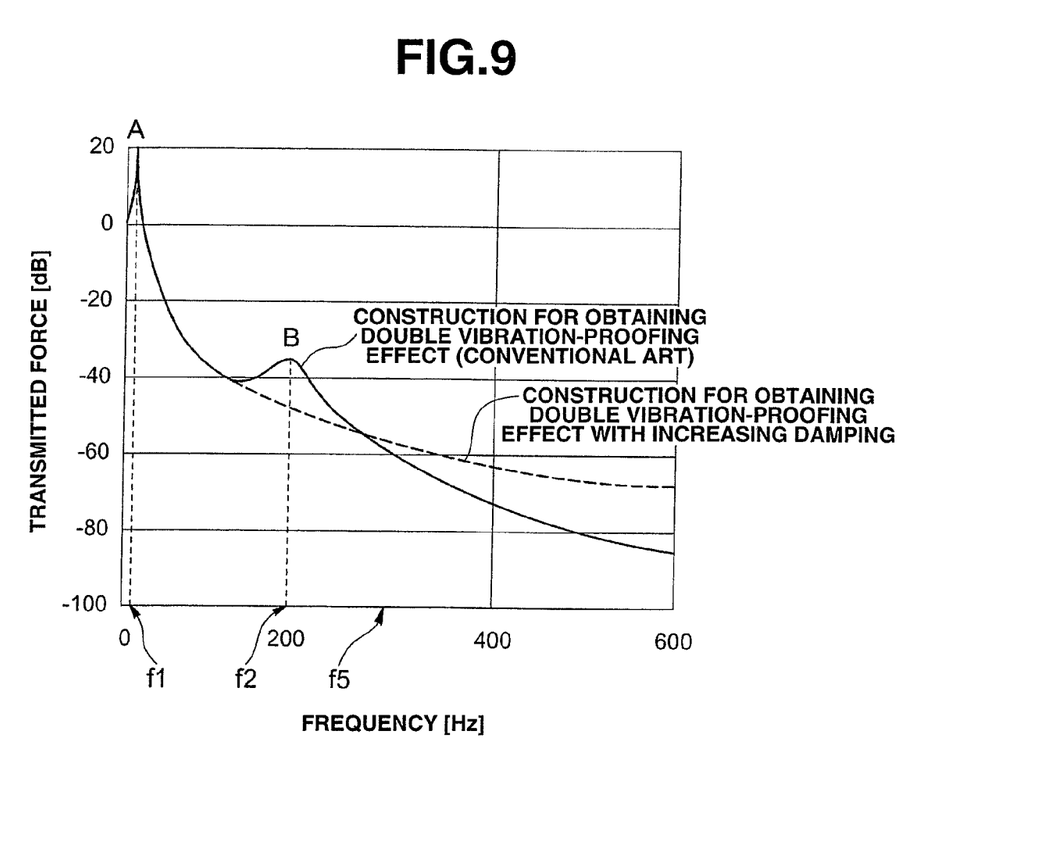
FIG. 9 is a characteristic diagram showing a relationship between frequency and a transmitted force in a construction in which a double vibration-proofing effect is obtained.

Specifically, as indicated by solid line in FIG. 9, the engine rigid body resonance A in the rod axis direction which is determined by the rigidity of elastic body 12c of bush 12 is generated at a frequency f1 [Hz] in the vicinity of substantially zero, and the rod rigid body resonance B in the rod axis direction which is determined by the rigidity of elastic body 13c of bush 13 is generated at a frequency f2 [Hz] in the vicinity of 200 Hz. For the sake of facilitating comprehension, the engine rigid body resonance A and the rod rigid body resonance B will be explained on the basis of extremely simplified spring mass system. The engine rigid body resonance A is determined by an engine mass and a rigidity (spring constant) of elastic body 12c of bush 12, and the rod rigid body resonance B is determined by a mass of rod 11 (inclusive of outer tubes of the respective bushes) which is a mass between elastic body 12c of bush 12 and elastic body 13c of bush 13, and a rigidity (spring constant) of elastic body 13c of bush 13.

In a general vehicle engine, a primary resonance frequency f3 of bending and/or twisting caused in engine 1 per se is in a range from approximately 280 Hz to 350 Hz. Therefore, by setting the resonance frequency of the engine rigid body resonance A to substantially zero (0 Hz) and setting the resonance frequency of the rod rigid body resonance B to approximately 200 Hz in accordance with this embodiment, transmission of bending and/or twisting resonant vibration in engine 1 to the vehicle body can be effectively suppressed (can be made double vibration proof) on a high frequency side (within a vibration proofing range).

As described above, the rigidity (spring constant) of elastic body 12c of bush 12, the mass of rod 11 (inclusive of outer tubes of the respective bushes) which is a mass between elastic body 12c of bush 12 and elastic body 13c of bush 13, and the rigidity (spring constant) of elastic body 13c of bush 13 can be set such that the engine rigid body resonance A and the rod rigid body resonance B are smaller than the resonance frequency f3 of bending and/or twisting of engine 1. A double vibration-proofing effect is an effect of suppressing vibration transmitted from engine 1 to the vehicle body side by generating the engine rigid body resonance A and the rod rigid body resonance B at two different frequencies, that is, at the frequency f1 in a low frequency region and the frequency f2 in an intermediate frequency region. However, in the anti-vibration device of the present invention, it is not essential to set the diameters of the outer tubes and the inner tubes of bushes 12, 13 to be different from each other. Bushes 12, 13 may have same construction as described later.

As shown in FIG. 3, upper torque rod 5 of this embodiment includes inertia mass 15 made of a magnetic material such as metals, actuator 17, acceleration sensor 21, band pass filter 22 and voltage amplification circuit 23.

Inertia mass 15 is disposed around rod 11 in a coaxial relation to rod 11. A cross section of inertia mass 15 as viewed in an axial direction of rod 11 has a shape symmetric with respect to a center (a center of gravity) of rod 11, in which a center of gravity of inertia mass 15 is aligned with the center of rod 11. Inertia mass 15 has a prismatic tubular shape as shown in FIG. 2, FIG. 4A, FIG. 4B and FIGS. 5A-5D. Inertia mass 15 has both ends in the axial direction of rod 11 (upper and lower ends in FIG. 3) which are connected to rod 11 through elastic support springs 16, respectively. Each of elastic support springs 16 is, for instance, a leaf spring having a relatively small rigidity. A part of inner wall 15a of inertia mass 15 projects inwardly toward permanent magnet 17c of actuator 17 as explained later.

As shown in FIG. 3, in upper torque rod 5 of this embodiment, actuator 17 is disposed in a space between inertia mass 15 and rod 11. Actuator 17 is a linear type (linear motion type) actuator including prismatic tubular core 17a, coil 17b and permanent magnet 17c, and serves to reciprocate inertia mass 15 in the axial direction of rod 11.

Core 17a that forms a magnetic path of coil is constituted of a plurality of laminated steel plates, and is fixedly disposed on rod 11. Core 17a is split into a plurality of segments before assembling upper torque rod 5. The plurality of segments are bonded to a periphery of rod 11 by an adhesive to form the entire prismatic tube-shaped core 17a. Coil 17b is wound around core 17a. Permanent magnet 17c is provided on an outer peripheral surface of core 17a.

Thus constructed actuator 17 drives inertia mass 15 to reciprocate linearly, that is, in the axial direction of rod 11 by reactance torque produced by a magnetic field generated by coil 17b and permanent magnet 17c.

Acceleration sensor 21 is disposed between bushes 12, 13 and is mounted on a plane parallel with a horizontal plane extending through a central axis of rod 11. Acceleration sensor 21 detects acceleration of vibration in the axial direction at a position substantially aligned with the central axis of rod 11 to thereby determine acceleration of vibration transmitted from engine 1 to rod 11. A signal indicative of acceleration of vibration in the rod axis direction which is generated from acceleration sensor 21 is inputted to voltage amplification circuit 23 through band pass filter 22. A signal amplified in voltage amplification circuit 23 is applied to coil 17b of actuator 17 (to carry out voltage control). Voltage amplification circuit 23 may be constituted of, for instance, an operational amplifier. Acceleration sensor 21 will be explained in detail later.

Inertia mass 15 is supported by relatively soft leaf springs (elastic support springs 16). Resonance of inertia mass 15 in the rod axis direction with respect to rod 11 is generated at a low frequency, for instance, from 10 Hz to 100 Hz. For instance, the secondary vibration frequency at an idle rotation speed of a four-cylinder engine is approximately 20 Hz. Therefore, if resonance frequency of inertia mass 15 is set at 10 Hz, resonance of inertia mass 15 can be suppressed regardless of an operating condition of engine 1.

On the other hand, in a case where it is difficult to set the resonance frequency of inertia mass 15 at such a low frequency as 10 Hz for reasons of excessive increase in inertia mass 15, the resonance frequency of inertia mass 15 can be set at a frequency lower than about ½ of the rod rigid body resonance B (200 Hz in this embodiment) to be suppressed. Even in this case, the resonance frequencies of inertia mass 15 and rod 11 are sufficiently separated from each other so that transmission of vibration can be surely suppressed.

In addition, the acceleration signal detected by acceleration sensor 21 is passed through band pass filter 22. Therefore, control is not executed at unnecessary frequencies so that control stability can be enhanced. It is also possible to reduce useless power consumption and reliably suppress the transmitted force in a target frequency range. A vibration proofing region relative to the rod rigid body resonance B includes a frequency range up to a frequency not lower than a frequency f5 as shown in FIG. 9 which is obtained by multiplying a resonance frequency f2 of the rod rigid body resonance B by a predetermined value (approximately 1.4). Band pass filter 22 is selected so as to pass not only signal of a resonance frequency of inertia mass 15 in the rod axis direction (low frequency from 10 Hz to 100 Hz) but also signal of a frequency range that is not lower than the resonance frequency of inertia mass 15 in the rod axis direction and is not higher than an upper limit (for instance, 400 Hz) of such a frequency range at which control is not dispersed within the vibration proofing region relative to the rod rigid body resonance B.

Actuator 17 is operated to generate a force being opposite in sign to a force being substantially proportional to the velocity of vibration in the rod axis direction detected by acceleration sensor 21 in a frequency band passed through band pass filter 22 such that velocity feedback control for increasing damping of rod 11 as an object to be controlled is performed.

Figure 4A:
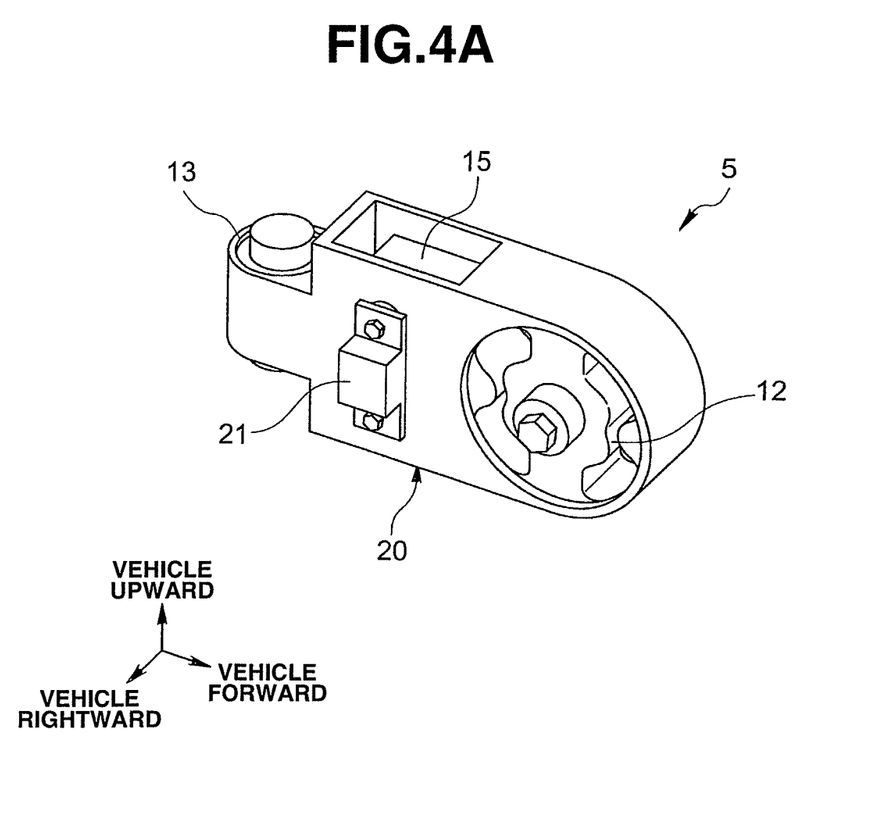
FIG. 4A is a perspective view of the upper torque rod as shown in FIG. 1B.
Figure 4B:
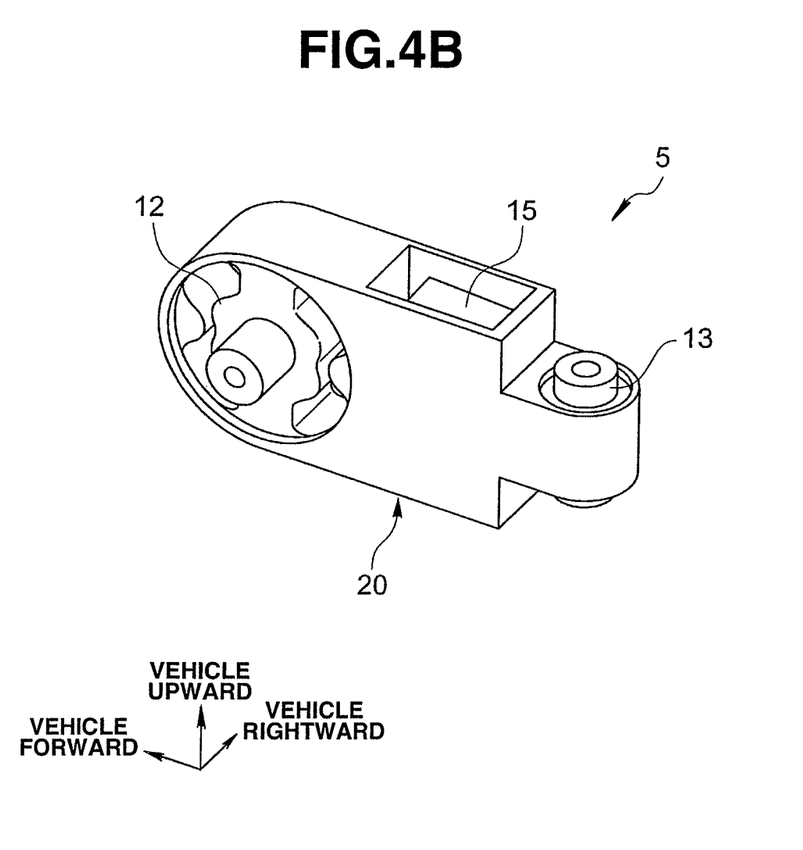
FIG. 4B is a perspective view of the upper torque rod as viewed from an opposite side of FIG. 4A.
Figures 5A, 5B, 5C:
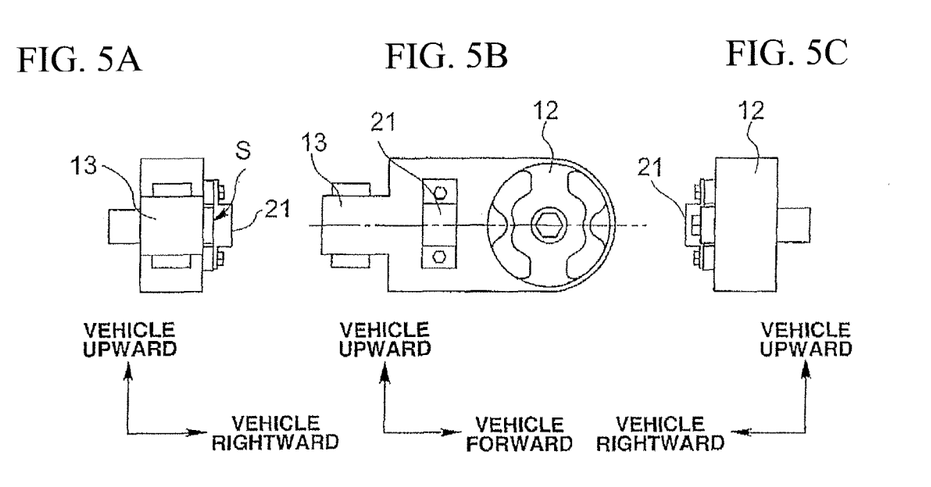
FIGS. 5A, 5B, 5C and 5D show four views (front view, left side view, right side view and plan view) of the upper torque rod shown in FIG. 4A and FIG. 4B.
Figure 5D:
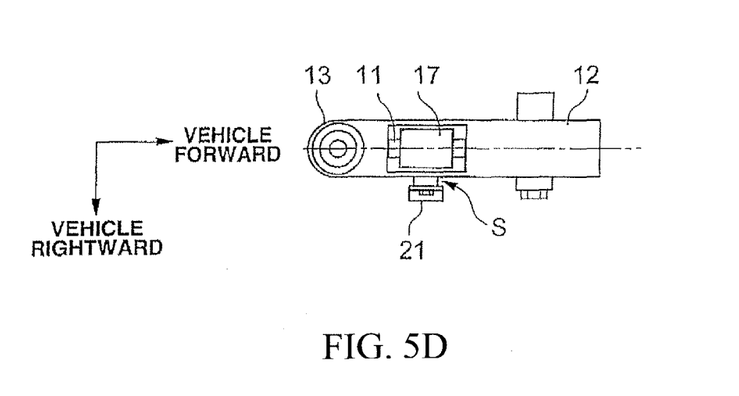

Next, acceleration sensor 21 is explained. Acceleration sensor 21 according to this embodiment is directly mounted on rod 11 as shown in FIG. 3, or may be mounted on housing 20 that covers rod 11 and bushes 12, 13 as shown in FIG. 4A. Housing 20 is constituted of a rigid body fixed to outer tubes 12a, 13a of bushes 12, 13 or formed integrally with outer tubes 12a, 13a. With this construction, vibration in the axial direction and the pitch direction of rod 11 can be equivalently transmitted.

Figure 7:
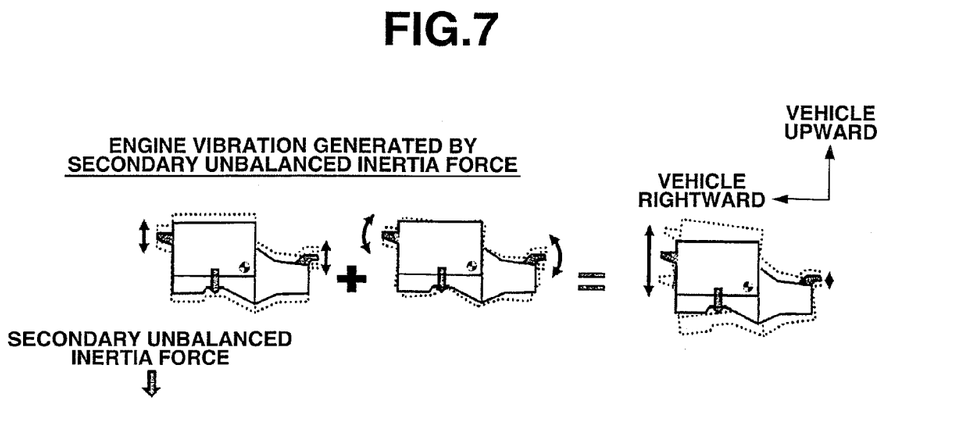
FIG. 7 is an explanatory diagram showing a vibration state of the engine.
Figure 10:
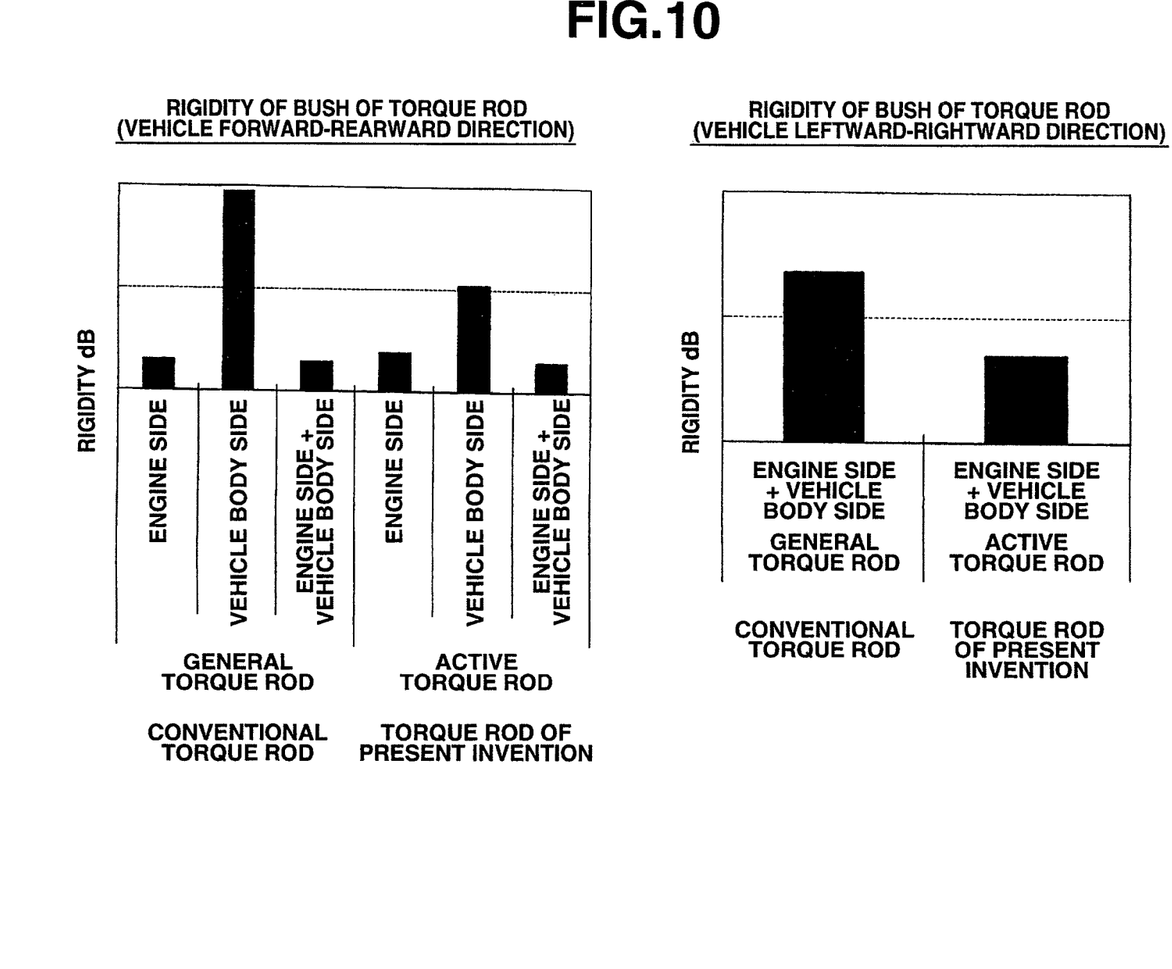
FIG. 10 shows graphs of examples of setting of rigidity of a bush of the torque rod.

Acceleration sensor 21 according to this embodiment is disposed between bushes 12, 13 and mounted on a plane parallel with a horizontal plane extending through the central axis of rod 11 (a torque supporting axis). In a four-cylinder engine, etc., as shown in FIG. 7, vibration is generated due to an unbalanced inertia force in an up-and-down direction. In a case where a sensor is disposed in a position upwardly offset with respect to a direction of the torque supporting axis of rod 11, vibration in the pitch direction is generated in the torque rod due to vibration of engine 1 in the up-and-down direction. In contrast, in this embodiment, acceleration sensor 21 is disposed on the plane parallel with the horizontal plane extending through the torque supporting axis of rod 11, and therefore, the sensitivity to the vibration in the pitch direction is reduced. That is, accuracy in detection of the vibration in the axial direction can be enhanced. As a result, as shown in FIG. 10, even in a case where the rigid body resonance in the axial direction of rod 11 is reduced to a large extent, almost no noise generated due to the rigid body resonance in the pitch direction is detected. Therefore, it is possible to suppress such a problem that similarly to the conventional art, acceleration sensor 21 detects reduction of the rigid body resonance in the pitch direction to a normal region to thereby cause an increased control power for actuator 17.

Especially, acceleration sensor 21 is disposed between bushes 12, 13. That is, acceleration sensor 21 is arranged in a region in which a node of the rigid body resonance in the pitch direction of rod 11 is present, so that the sensitivity in the pitch direction becomes smaller.

Further, in the anti-vibration device according to this embodiment, a ratio between rigidity of bush 12 and rigidity of bush 13 fixed to both ends of rod 11 may be set at a predetermined value, and at least one of acceleration sensor 21 and actuator 17 may be disposed at the node of the rigid body resonance in the pitch direction of rod 11. By locating acceleration sensor 21 or actuator 17 at the node of the rigid body resonance mode, detection of the rigid body resonance in the pitch direction can be further suppressed to thereby reduce control power for actuator 17 which is caused based on the detection of the rigid body resonance in the pitch direction.

Figure 8A:
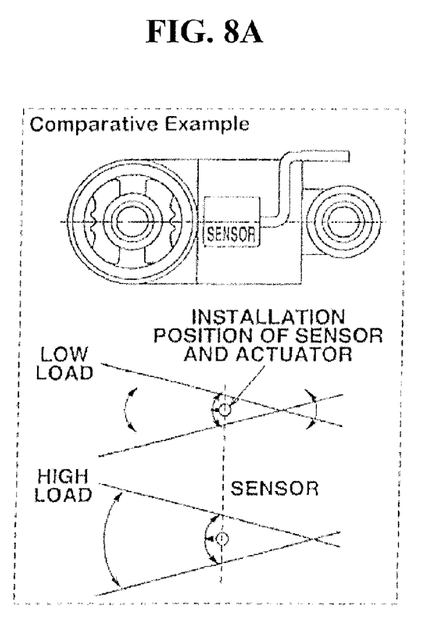
FIG. 8A and FIG. 8B are the sectional views of an anti-vibration device according to a comparative example and a modified example.
Figure 8B:
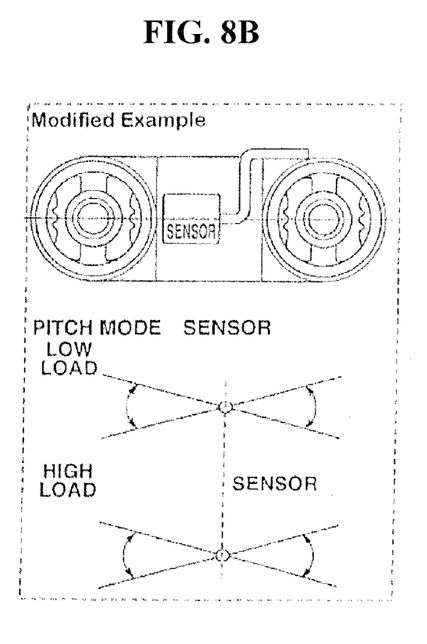

In the anti-vibration device as described above, bushes 12, 13 are different in outer appearance from each other. However, as shown in FIG. 8B, two bushes 12, 13 may be formed into same shape while a ratio between rigidity of bush 12 and rigidity of bush 13 is set at a predetermined value. In such a case, even when an operating condition is changed, the node of the rigid body resonance in the pitch direction can be placed at same position as an installation position of acceleration sensor 21 or actuator 17. As a result, detection accuracy can be enhanced as compared to an example as shown in FIG. 8A.

Figure 6A:
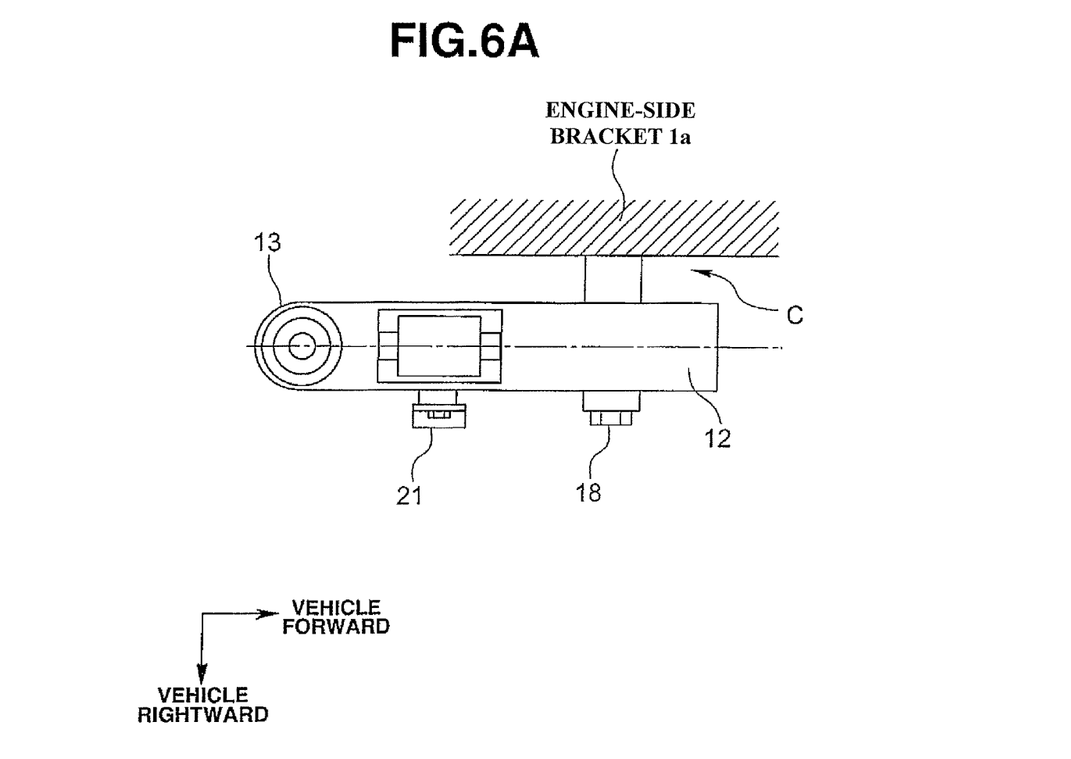
FIG. 6A is a plan view showing an example of mounting the upper torque rod shown in FIG. 4A and FIG. 4B to an engine.
Figure 6B:
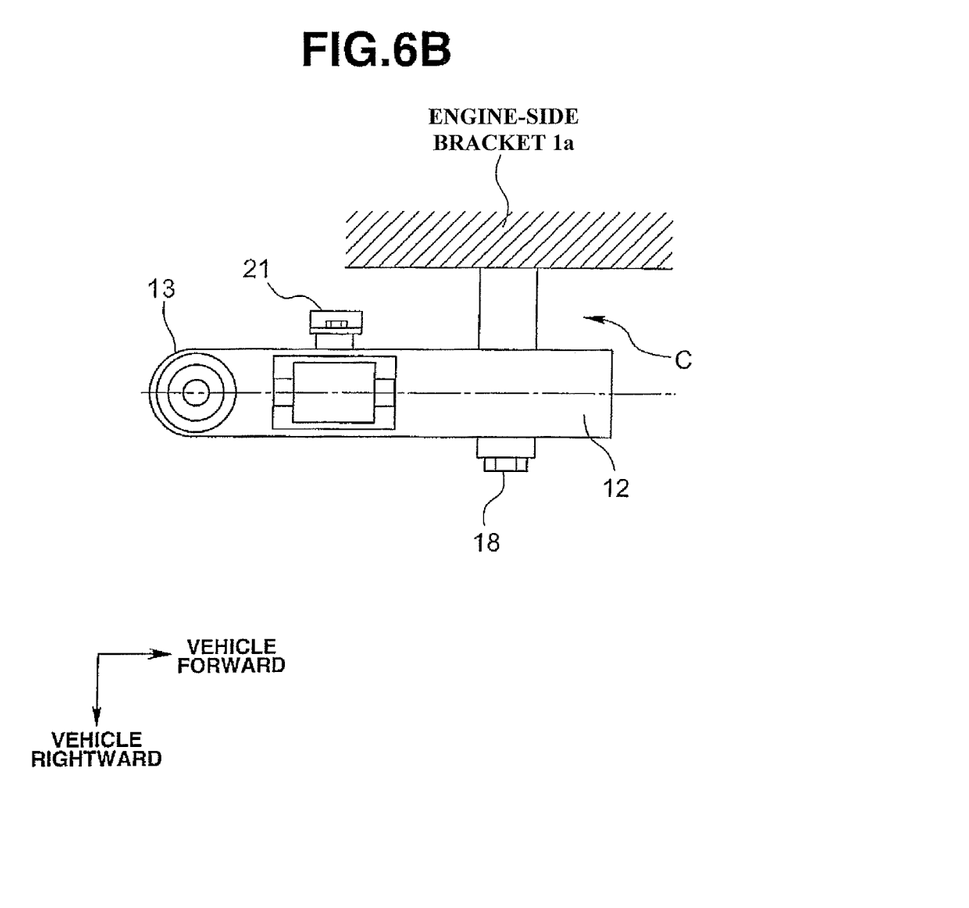
FIG. 6B is a plan view showing other example of mounting the upper torque rod shown in FIG. 4A and FIG. 4B to an engine.

Further, as shown in FIG. 6B, acceleration sensor 21 according to this embodiment can be fixed to a surface of rod 11 or housing 20 on a side of engine 1 with respect to bracket 1a of engine 1 to which bush 12 is fixed by bolt 18. However, as shown in FIG. 6A, acceleration sensor 21 according to this embodiment is preferably fixed to a side surface of rod 11 or housing 20 on an opposite side of engine 1 (that is, on a side distant from engine 1) with respect to bracket 1a of engine 1.

In the anti-vibration device according to this embodiment, as shown in FIG. 10, the rigidity of vehicle body side bush 12 of upper torque rod 5 is reduced to a large extent as compared to the conventional upper torque rod. Therefore, for instance, when the vehicle is turned, the upper torque rod is largely oscillated in the leftward-rightward direction of the vehicle due to acceleration of the upper torque rod per se. Accordingly, it is necessary to set a clearance C between engine 1 and upper torque rod 5 larger than that for the conventional upper torque rod.

On the other hand, a force caused due to an unbalanced inertia force acts on a portion of engine 1 which is located forward of the center of gravity G, and generates a moment thereat. Accordingly, vibration caused in a front end portion of engine 1 due to up-and-down displacement of engine 1 becomes larger. Therefore, in a case where acceleration sensor 21 is installed on the surface of housing 20 of upper torque rod 5 on the opposite side of engine 1 apart from engine 1 as shown in FIG. 6A, the clearance C between upper torque rod 5 and engine 1 can be decreased, and the up-and-down vibration of engine 1 which is transmitted to upper torque rod 5 can be reduced. Similarly, since the clearance C between upper torque rod 5 and engine 1 can be decreased, a dimension of a part relating to coupling of the torque rod on the side of engine 1 can be decreased, and a natural frequency of the part relating to coupling can be increased.

Further, in the anti-vibration device according to this embodiment, upper torque rod 5 includes actuator 17 as a heat source, and therefore, heat transfer to acceleration sensor 21 should be considered. However, acceleration sensor 21 can be disposed on the opposite side of engine 1 in a position in which an airflow from the front side of the vehicle passes through. Accordingly, heat radiation performance of acceleration sensor 21 can be enhanced.

In acceleration sensor 21 according to this embodiment, as shown in a side view on the left side of and a plan view of FIGS. 5A-5D, space S is provided between acceleration sensor 21 and the surface of housing 20 to which acceleration sensor 21 is mounted. The space S is provided in a direction in which an air in an engine room flows. As a result, the heat radiation performance of acceleration sensor 21 can be enhanced, and heat transfer from actuator 17 as a heat source can be suppressed.

The above construction of acceleration sensor 21 is same as that of the acceleration sensor of lower torque rod 6. However, upper torque rod 5 is mounted to a position further distant from a center of gravity of a power train than lower torque rod 6, and therefore, upper torque rod 5 can attain a larger effect than lower torque rod 6.

The above-described acceleration sensor 21 corresponds to a vibration detection section according to the present invention.

What is claimed is:

1. An anti-vibration device for a vehicle, comprising:
   a rod fixed to an engine at one end portion thereof and fixed to a vehicle body at the other end portion thereof;
   an actuator comprising an inertia mass supported on the rod and operative to reciprocate the inertia mass in an axial direction of the rod; and
   a vibration detection section configured to detect vibration of the rod in the axial direction of the rod,
   wherein the vibration detection section is disposed between the one end portion of the rod and the other end portion of the rod, and is disposed on a side of the rod opposite to a side of the rod facing the engine in a leftward-rightward direction of the vehicle.

2. The anti-vibration device for a vehicle as claimed in claim 1, wherein a space extending in a forward-rearward direction of the vehicle is provided between the vibration detection section and a surface of the rod on which the vibration detection section is disposed.

3. The anti-vibration device for a vehicle as claimed in claim 1, wherein a ratio between rigidity of a bush disposed on the one end portion of the rod and rigidity of a bush disposed on the other end portion of the rod is set at a predetermined value, and
   wherein at least one of the vibration detection section and the actuator is disposed at a node of rigid body resonance in a pitch direction of the rod.

4. The anti-vibration device for a vehicle as claimed in claim 3, wherein the bush disposed on the one end portion of the rod and the bush disposed on the other end portion of the rod have a same shape.

5. The anti-vibration device for a vehicle as claimed in claim 1, wherein the rod is fixedly disposed between an upper portion of the engine and the vehicle body.

6. The anti-vibration device for a vehicle as claimed in claim 1, wherein the vibration detection section is mounted to the rod.

7. The anti-vibration device for a vehicle as claimed in claim 1, wherein the vibration detection section is mounted to a housing that covers the rod.

8. The anti-vibration device for a vehicle as claimed in claim 1, wherein the vibration detection section is disposed on a plane parallel with a longitudinal axis of the rod.

9. An anti-vibration device for a vehicle, comprising:
   a rod fixed to an engine at one end portion thereof and fixed to a vehicle body at the other end portion thereof;
   an actuator comprising an inertia mass supported on the rod and operative to reciprocate the inertia mass in an axial direction of the rod; and
   means for detecting vibration of the rod in the axial direction of the rod, wherein the means is disposed between the one end portion of the rod and the other end portion of the rod, and is disposed on a side of the rod opposite to a side of the rod facing the engine in a leftward-rightward direction of the vehicle.

* * * * *